United States Patent [19]
Leimbach et al.

[11] Patent Number: 5,810,144
[45] Date of Patent: Sep. 22, 1998

[54] CLUTCH ACTUATOR FOR A MOTOR VEHICLE FRICTION CLUTCH

[75] Inventors: Lutz Leimbach, Grafenrheinfeld; Jens Dorfschmid, Schonungen, both of Germany

[73] Assignee: Fichtel & Sachs AG, Schweinfurt, Germany

[21] Appl. No.: 680,182

[22] Filed: Jul. 15, 1996

[30] Foreign Application Priority Data

Jul. 15, 1995 [DE] Germany .................. 195 25 840.1

[51] Int. Cl.$^6$ .................. F16D 27/00; B60K 23/02
[52] U.S. Cl. ............ 192/84.6; 74/89.18; 192/30 V; 192/90; 192/109 R
[58] Field of Search ............... 192/109 R, 109 A, 192/84.6, 90, 99 S, 91 R, 30 V; 74/89.18, 89.14

[56] References Cited

U.S. PATENT DOCUMENTS

| | | | |
|---|---|---|---|
| 3,088,727 | 5/1963 | Pelagatti | 74/89.18 |
| 3,273,410 | 9/1966 | Pickles | 74/89.18 |
| 4,498,350 | 2/1985 | Rose | 192/109 A X |
| 4,852,419 | 8/1989 | Kittel et al. | 192/84.6 X |

FOREIGN PATENT DOCUMENTS

| | | |
|---|---|---|
| 3706849 | 9/1988 | Germany . |
| 4138625 | 5/1993 | Germany . |
| 2161237 | 1/1986 | United Kingdom . |
| 2204657 | 11/1988 | United Kingdom . |
| 2154297 | 9/1995 | United Kingdom . |

*Primary Examiner*—Rodney H. Bonck
*Attorney, Agent, or Firm*—Cohen, Pontani, Lieberman, Pavane

[57] ABSTRACT

A clutch actuator for a motor vehicle friction clutch has a drive, a gear unit which converts the movement of the drive into a substantially translatory movement of an output member, the excursion of this gear unit being definable with respect to every working direction by at least one stop, and a clutch position detector. A damping device is associated with each stop. In a position of the gear unit in which the gear unit, in a movement directed toward the stop, has reached an exactly defined reference position relative to this stop, this reference position being situated prior to the stop, the damping device can be activated in order to retard the gear unit until the latter comes into contact with the stop.

12 Claims, 4 Drawing Sheets

CLUTCH ACTUATOR FOR A MOTOR
VEHICLE FRICTION CLUTCH

BACKGROUND OF THE INVENTION

1. Field of the Invention

The invention is directed to a clutch actuator for a motor vehicle friction clutch.

2. Description of the Prior Art

A clutch actuator which is known from DE 37 06 849 A1 has a drive and a gear unit which converts the movement of the drive into a substantially translatory movement of an output member in the form of a hydraulic transmitter cylinder and whose deflection path is defined by stops. The gear unit is designed as a worm gear with a worm on the drive side and a segment worm gearwheel which is rotatably supported in a housing.

The a clutch actuator is constructed with a clutch position detector so that the exact position of the segment worm gearwheel is known at all times by means of a control acting on the drive. However, if erroneous readings are supplied due to a disturbance in the clutch position detector, a predetermined end position for the gear unit may not be detected due to incorrect drive control and the segment worm gearwheel runs against the associated stop at a moment composed of the moment delivered by the drive plus the moment of inertia of the gear unit. Even if the stop, as described in the German reference, is provided with a lining of resilient material, there is a risk that the impact of the worm gear on the stop will be insufficiently damped so that the occurring forces can result in destruction of elements of the gear unit, especially if some parts are made of plastic.

SUMMARY OF THE INVENTION

Accordingly, it is an object of the present invention to provide a clutch actuator in which destruction of structural component parts of the gear unit is prevented even when a predetermined end position is reached at excessive velocity.

Pursuant to this object, and others which will become apparent hereafter, one aspect of the present invention resides in a clutch actuator for a motor vehicle friction clutch, which clutch actuator includes a drive and a gear unit operatively connected to the drive to convert movement of the drive into a substantially translatory movement of an output member of the gear unit. A plurality of stops are arranged to define an excursion of the gear unit in each working direction of the gear unit. Clutch position detecting means are provided for detecting the position of the clutch. Damping means are associated with each stop, and control elements are arranged to follow the movement of the gear unit and to be engagable in a working connection with the damping means. The damping means are operative to be activated when the gear unit reaches a position in which the gear unit has reached an exactly defined reference position relative and prior to one of the stops, in a movement direction toward the stop, to retard the gear unit via the control elements until the gear unit comes into contact with the stop. By associating a damping device with a stop, the gear unit of a clutch actuator moving in the direction of one of the stops is substantially retarded by the damping device until this stop is reached as soon as the gear unit reaches a reference position arranged upstream of this stop. Thus, while a moment, e.g., the moment delivered by the drive, can still act at the gear unit when the stop is reached, this moment no longer has the magnitude it had assumed before reaching the reference position arranged upstream of the stop when under the influence of the inertia brought about by movement. Since the moment delivered by the drive when moving against the stop, especially in a clutch actuator according to the previously discussed German reference in which the force of an axial spring of the friction clutch and the force of a compensation of the clutch actuator which act against one another apply the substantial component of the moment and the drive need only supply the force differential, the moment which must be absorbed at the stop after the retardation of the gear unit between the defined reference position associated with the stop and the stop itself is relatively small. Thus, the gear unit cannot be destroyed by the affect of this moment. On the other hand, the substantially greater moment, which occurs especially under the influence of the inertia of the drive when the gear unit is to be braked in the region of the stop, can be reduced by the effect of the damping device before the gear unit has reached the associated stop.

Clutch actuators which have a clutch position detector provided with an incremental transducer benefit particularly from the invention. This clutch position detector can detect a movement of the gear unit and accordingly a relative change in position of same, but is not capable of determining the absolute position. For this purpose, the exactly defined reference position is advantageously used as an absolute position of the gear unit so that a possible absolute position is occupied when the gear unit comes to a standstill at such a reference position. This requirement is advantageously met by another embodiment of the invention in which the pretensioning of a force accumulator contained in the damping device is predetermined so that the moment opposing the force accumulator prior to a deformation of the gear unit exceeds the moment introduced by the drive. The effect is such that an element of the gear unit which slowly approaches the defined reference position is not capable of deforming the force accumulator and accordingly reaching the stop, but rather comes to a standstill in the reference position. A deformation of the force accumulator accompanied by a simultaneous retardation of the gear unit striking the stop results only when the gear unit element approaches the defined reference position at an excessive velocity during a faulty controlling of the drive due to a disturbance in the clutch position detector and accordingly overcomes the resistance moment of the moment opposing the force accumulator. In addition to the aforementioned advantage of the arrangement of the force accumulator with pretensioning, the retardation process based on a shorter retardation path is also more effective than in a comparable force accumulator without pretensioning due to the characteristic of the force accumulator. However, it is also conceivable to use such a force accumulator without pretensioning insofar as no importance is placed on the presence of an exactly defined reference position. In this case, the retardation behavior of the force accumulator is maintained, but slight fluctuations in the introduced moment cause a shifting of the reference position relative to the stop.

In still another embodiment of the invention the gear unit has a segment toothed wheel or gearwheel which is rotatably supported in a housing. In a further development of a gear unit of this kind, a stop element is associated with the segment gearwheel. The stop element, like the segment gearwheel, is provided for receiving a force accumulator and is movable relative to the segment gearwheel. According to this embodiment, the stop element projects out over the segment gearwheel in the circumferential direction so that it comes into contact with the associated stop before the segment gearwheel can reach this stop. When the stop is reached, the stop element comes to a standstill while the segment gearwheel continues its previous motion which, however, now takes place accompanied by deformation of the force accumulator against its action so that the segment gearwheel is braked. As was described in the previous embodiment, the force accumulator can be used with or without pretensioning depending on whether or not an exactly defined reference position relative to the stop is required.

In an advantageous further embodiment of the damping device, widened portions are provided for guiding the control elements at the segment gearwheel or at the stop element. An additional function is assigned to the control elements of the segment gearwheel according to another embodiment of the invention in that these control elements prevent bending of the force accumulator, which is constructed as a coiled spring, by means of a suitable alignment of their sides facing the force accumulator. Moreover, in an additional embodiment of the invention the control elements are used to connect the segment gearwheel with the stop element in a positive engagement so as to effectively counteract possible bending of the coil spring in the direction of extension of the bearing neck of the segment gearwheel.

In yet further embodiments of the invention, due to the fact that the force accumulator is in a working connection with a stationary structural component part in the form of the housing of the adjusting device on the one hand and, on the other hand, with a movable structural component part in the form of a gearwheel, e.g., a circular or segment gearwheel, a running groove is provided for the force accumulator. The force accumulator is received in this running groove when the movable structural component part moves relative to the stationary structural component part. This is advantageous in that there is a smaller moved mass, since a stop element, which is drivable via the gearwheel, can be omitted.

In another embodiment of the invention force accumulators are arranged so that they project out over the circumferential boundaries of a segment gearwheel in the circumferential direction so that the stop element and the running groove can both be dispensed with in that the force accumulators are controlled by means of the associated stop when making contact therewith.

This very simply designed construction can be developed further in an advantageous manner in that the force accumulators are formed by coil springs which extend in the circumferential direction in suitable recesses that are formed in the segment gearwheel.

In addition, in a further embodiment, the force accumulators are enclosed by a protective cover at their projecting ends in order to protect against damage and to ensure that they cannot disengage from the recess of the segment gearwheel. The protective cover engages behind a corresponding cross-sectional widening in the recess by a radial widened portion. In still a further embodiment of the invention the respective coil spring can be acted upon by a predetermined pretensioning by means of suitable dimensioning of the protective cover with respect to the projecting distance of the coil spring relative to the circumferential boundary of the segment gearwheel. The advantages of this pretensioning have already been described.

Yet another embodiment of the invention provides tension springs between a gearwheel and a stop element so that the movement transmitted from the drive to the gearwheel is transmitted to the stop element via the tension springs. This arrangement works so that a projection of the stop element associated with one movement direction first reaches the stop and then brakes the gearwheel accompanied by a deformation of the associated tension spring, so that the stop in this construction acts as the exactly defined reference position after which a retardation of the gearwheel occurs. As previously explained, this applies in particular when the tension spring is installed with pretensioning which is greater than the moment which can be delivered by the drive.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
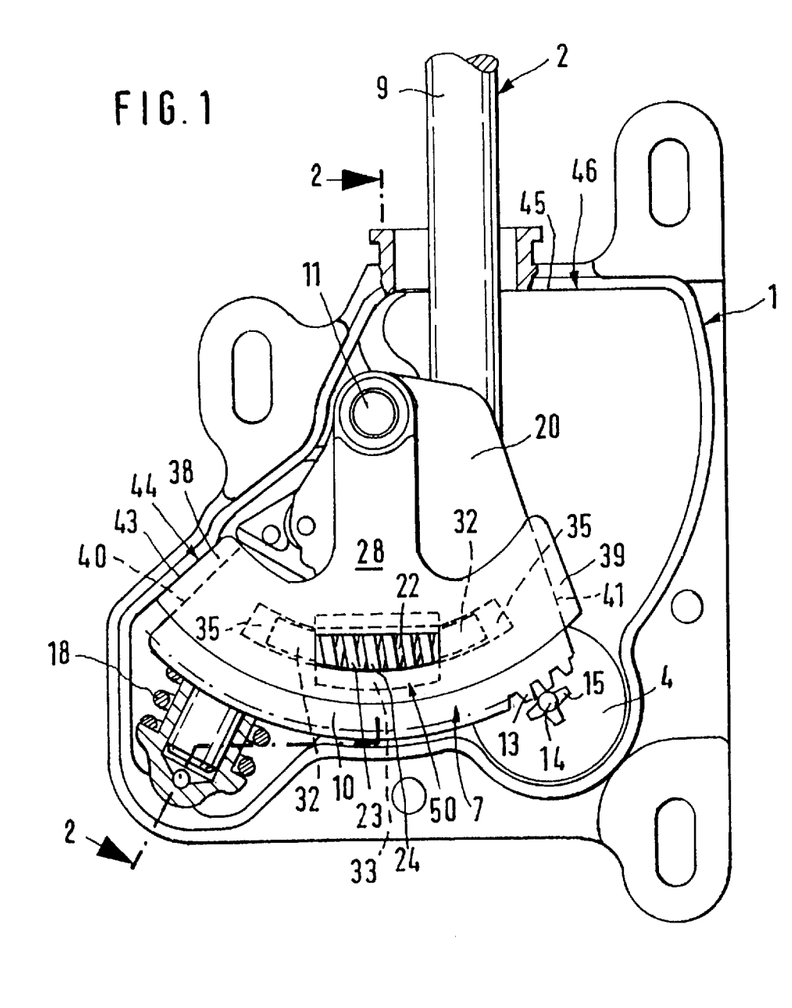
FIG. 1 is a partial sectional view of the underside of an driven clutch actuator for a motor vehicle friction clutch with an output member, e.g., for a clutch release system, pursuant to the present invention.
Figure 2:
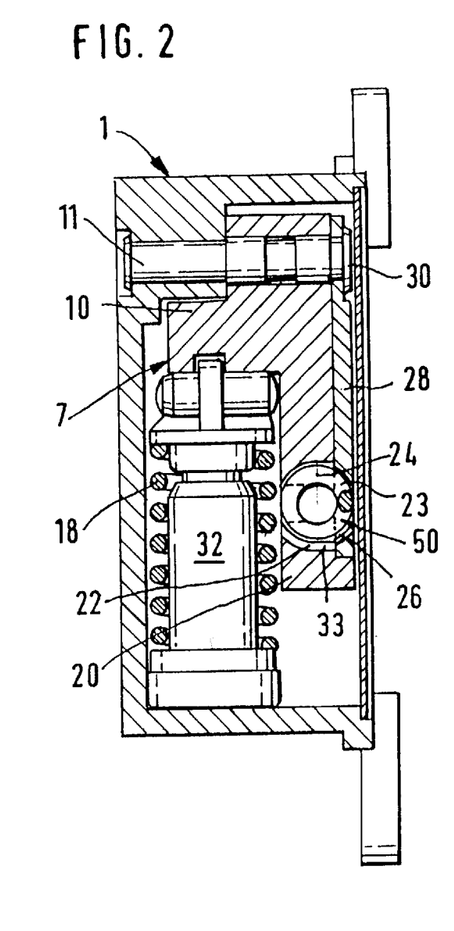
FIG. 2 is a sectional view of the clutch actuator along line 2—2 in FIG. 1.

FIGS. 1 and 2 show a clutch actuator for a motor vehicle friction clutch with a clutch release system. The clutch actuator comprises a housing 1 with a drive 4 in the form of an electric motor which actuates via a gear unit 7, which is constructed as a crank mechanism, and an output member 2 which is formed, e.g., by a piston rod 9 of the clutch release system mentioned above.

The gear unit 7 has a segment gearwheel 10 which is rotatably supported on a bearing neck 11 which is attached at one end in the housing 1. A pinion 15 is fitted directly on the driven shaft 14 of the drive 4 and engages with teeth 13 provided at the circumference of the segment gearwheel 10. A compensation spring 18 which is supported at the housing 1 is arranged at the segment gearwheel 10 in a manner not shown in more detail so as to be movable relative to the segment gearwheel 10. The construction of the clutch actuator described thus far is known from the prior art, e.g., from DE 37 06 849 A1 which was mentioned previously, so that a detailed description is not required.

The actual subject matter of the invention will be discussed in detail in the following. The segment gearwheel 10 has a cheek 20 which extends away radially from the center axis of the bearing neck 11 and in which is provided a recess 22 for a force accumulator 23 in the form of a coiled spring 24. The force accumulator 23 is arranged in the recess 22 as well as in a recess 26 of a plate-shaped stop element 28 which is likewise received at the bearing neck 11 and extends radially to the center axis of the latter. The stop element 28 is held in contact with the segment gearwheel 10 by a riveted joint end 30 at the underside of the bearing neck 11.

Figure 3:
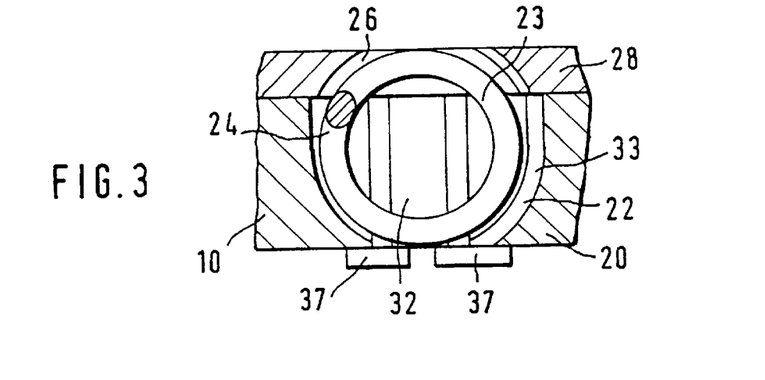
FIG. 3 is an enlarged detail from a region of the clutch actuator with a segment gearwheel and a stop element.

The recess 22 of the segment gearwheel 10 extends in the circumferential direction in the same way as the recess 26 of the stop element 28 and is constructed with the same dimensions. The force accumulator 23 is preferably inserted in the recesses 22, 26 so that its ends on the circumferential side make contact with a pretensioning which is greater than the moment which can be delivered by the drive 4. A control element 32 contacts both ends of the force accumulator 23, its sides which face the force accumulator 23 being aligned in relation to the bearing neck 11 and accordingly relative to the rotational axis of the segment gearwheel 10 and stop element 28 so that when one of the ends of the force accumulator 23 is acted upon they exert a force substantially in the axial direction of the force accumulator 23. A bending of the force accumulator 23 in a space 33 of the recesses 22, 26 such as can occur when acted upon by deformation forces is prevented by this design step. In this way, it is ensured that the force accumulator 23 can be compressed virtually in a straight line when deformed by means of one of the control elements 32. The control elements 32 are fastened at the stop element 28 and penetrate widened portions 35 of the segment gearwheel 10 which extend at both sides of the recess 22 as viewed in the circumferential direction. The free ends of the control elements 32 can be provided with retaining means 37 which extend substantially vertically to the control elements 32 (FIG. 3) and engage behind the side of the segment gearwheel 10 remote of the stop element 28. This ensures, by way of supplementing the bearing neck 11, that the stop element 28 will be fixed at the segment gearwheel 10.

The stop element 28 has projections 38, 39. One projection 38 projects over the corresponding circumferential boundary 40 of the segment gearwheel 10 in the circumferential direction and the other projection 39 projects over the circumferential boundary 41 provided on the opposite side in the circumferential direction. In its end position, shown in FIG. 1, the one projection 38 contacts the associated wall 43 of the housing 1. The wall 43 serves as a first stop 44 for the segment gearwheel 10. In the other end position of the stop element 28, the projection 39 comes into contact with a wall 45 of the housing 1 so that this wall 45 acts as a second stop 46.

In the relative position of the stop element 28 and the segment gearwheel 10 shown in FIG. 1, the segment gearwheel 10 occupies an exactly defined first reference position which is represented in that the force accumulator 23 is not deformed but still prevents further movement of the segment gearwheel 10 in a direction of action toward the stop 44. A second reference position of just this kind results with respect to the other stop 46 in the same way when the stop element 28 occupies the second end position shown in FIG. 1 in which projection 39 contacts the stop 46.

The operation of the clutch actuator will be described in the following:

In the end position of the segment gearwheel 10 and the stop element 28 shown in FIG. 1, the left-hand control element 32 contacts the associated end of the force accumulator 23, wherein a pressing force which may be exerted on the force accumulator 23 by the segment gearwheel 10 is exceeded by the counterforce of the force accumulator 23 caused by the pretensioning. Thus, the segment gearwheel 10 occupies an exactly defined reference position relative to the first stop 44 associated with its circumferential boundary 40. If required for a control unit (not shown) of the clutch actuator this reference position can be used to provide this control unit with a reference position from which the segment gearwheel 10 can be deflected by a predetermined rotational angle. Such a reference position may be necessary, for instance, if a clutch position detector (not shown) 90 of the clutch actuator has an incremental transducer which can detect the movement direction and the distance covered by the movement of the segment gearwheel and transmit the results to the control unit, but which does not offer the possibility of determining the respective absolute position of the segment gearwheel 10. However, insofar as the control unit has a reference position available to it and continuously determines the most recent position of the segment gearwheel 10 in relation to this reference position during every movement process at the segment gearwheel 10, the actual position of the segment gearwheel 10 can also be determined at any time in such a construction of the clutch position detector 90. In order to ensure that no adjustment errors occur without corrective measures during a protracted period of operation of the clutch actuator, the reference position can be approached again at any time, the operating state permitting, in order to bring about in the control unit a confirmation or, if necessary, a correction of the data indicating the position of the segment gearwheel 10. Such clutch position detectors are known and need not be discussed in more detail. The important point with respect to the invention is the availability of such reference positions which can be used if required for controlling the clutch actuator.

The segment gearwheel 10 is set in rotation around the bearing neck 11 in that a movement generated at the drive 4 is transmitted to the toothing 13 of the segment gearwheel 10 via the driven shaft 14 of the drive 4 and the pinion 15. Since the recesses 22, 26 of the segment gearwheel 10 and stop element 28 are identically dimensioned in the circumferential direction, this rotational movement of the segment gearwheel 10 results in the stop element 28 being carried along in an identical movement. This synchronous movement of the two elements relative to one another is continued until the stop element 28 comes into contact with its projection 39 at the associated second stop 46. In the event that the projection 39 makes contact at the second stop 46 at a slow rotational speed, which is always the case during regular controlling of the adjusting device, only the moment introduced by the drive 4 acts on the segment gearwheel 10. As was already mentioned, this moment is smaller than the pretensioning of the force accumulator 23, so that the right-hand control element shown in FIG. 1 is not capable of deforming the force accumulator 23. As a result, the segment gearwheel 10 also comes to a halt, specifically at a distance from the second stop 46 corresponding to the distance between the projection 39 of the stop element 28 and the circumferential boundary 41 of the segment gearwheel 10 in FIG. 1. The segment gearwheel 10 accordingly occupies a second exactly defined reference position which can also be used as such.

While the force accumulator 23 is accordingly not effective during regular operation of the clutch actuator, the situation can change fundamentally in the case of a disturbance, e.g., when the control of the clutch actuator proceeds from an erroneous position of the segment gearwheel 10. It is then possible for the segment gearwheel 10 to move in the direction of a stop, e.g., toward the second stop 46, at a comparatively high speed so that the projection 39 of the stop element 28 strikes the second stop 46 with a great impact. Added to the moment delivered by the drive 4 is the inertia, especially of drive 4, which is effective during the impact and the abrupt braking of the stop element 28 caused by the impact. Accordingly, via the left-hand side of its recess 22 as seen in FIG. 1, the segment gearwheel 10 exerts a moment on the force accumulator 23 which deforms the latter in the direction of the second stop 46. The force accumulator 23 is supported by its other end at the right-hand control element 32. During the deformation of the force accumulator 23, the segment gearwheel 10 is gently braked so that it either does not reach the second stop 46 or, if it should strike the latter, rebounds with a slight momentum since the velocity has been reduced in the meantime. This effectively prevents any damage to or destruction of elements of the gear unit 7 of the clutch actuator by the force accumulator 23. The force accumulator 23 consequently acts as a damping device 50 in cooperation with the stop element 28 and the control element 32 of the segment gearwheel 10.

As soon as the segment gearwheel 10 comes to a standstill again after such braking, the force accumulator 23 tends to restore the segment gearwheel 10 to its defined reference position relative to the second stop 46. When the segment gearwheel 10 occupies this position, the control unit can carry out a correction of its data.

The same type of operation takes place in the opposite rotating direction of the segment gearwheel 10 at an excessive speed of the latter when the projection 38 of the stop element 28 strikes the first stop 44 with a great impact. In this case, the right-hand side of the recess 22 of the segment gearwheel 10, as seen in FIG. 1, will deform the force accumulator 23 which is supported at the first stop 44 via the left-hand control element 32.

Figure 4A:
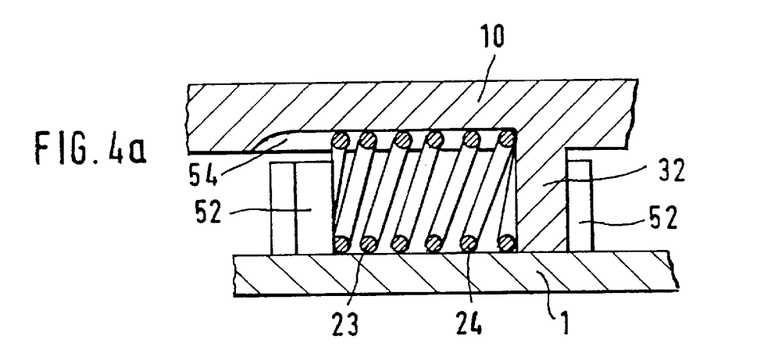
FIG. 4a is a section along line 4a—4a in FIG. 4b.
Figure 4B:
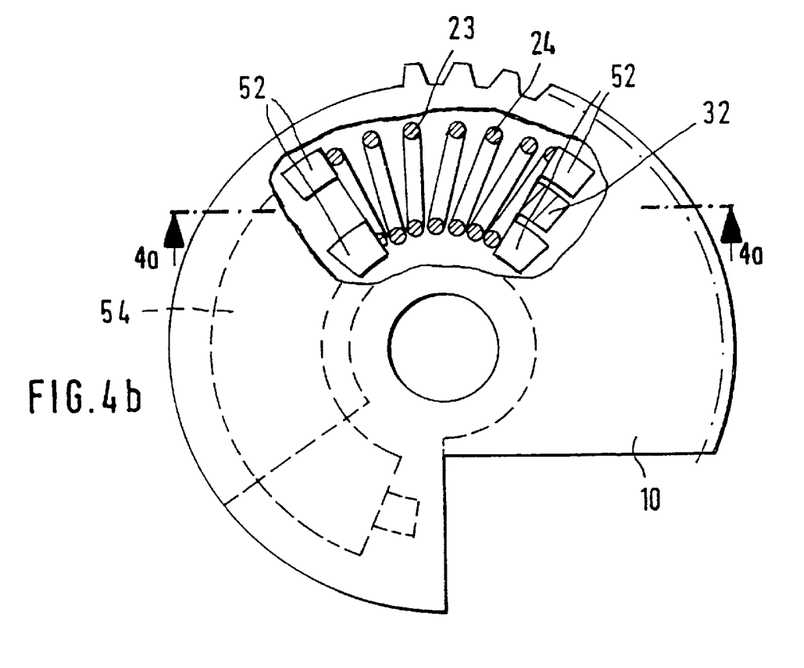
FIG. 4b is another embodiment of the clutch actuator with a force accumulator which is arranged between the housing and the segment gearwheel and is supported at the housing.
Figure 5A:
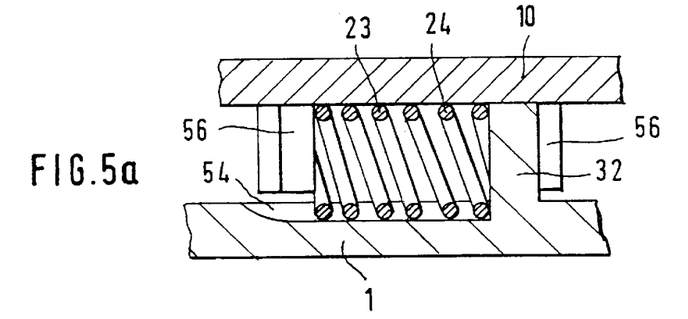
FIG. 5a is a section along line 5a—5a in FIG. 5b.
Figure 5B:
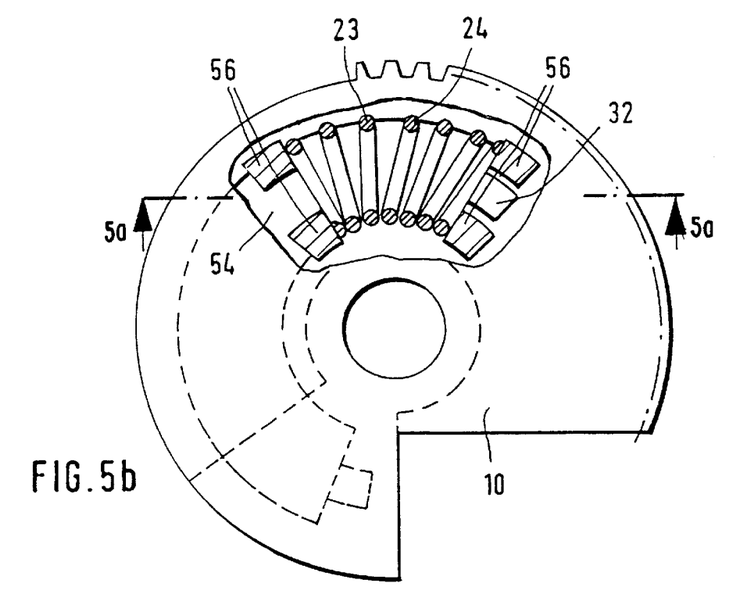
FIG. 5b is a view according to FIG. 4b in which, however, the force accumulator is received at the segment gearwheel.

In contrast to the construction according to FIG. 1 in which the force accumulator 23 of the damping mechanism 50 is received by two structural component parts, namely the segment gearwheel 10 and the stop element 28, which are both movable synchronously with one another along the substantial part of the adjusting path of the segment gearwheel 10, FIGS. 4a and 4b show another construction of clutch actuator in which the force accumulator 23 is arranged so as to be stationary, that is, by clamping the force accumulator 23 between holders 52 fitted to the housing 1 in a stationary manner. The control elements 32 required for a deformation of the force accumulator 23 are fastened to the segment gearwheel 10. Because of its relative movement with respect to the force accumulator 23 and the holders 52, the segment gearwheel 10 is constructed with a running groove 54 into which the force accumulator projects. FIGS. 5a and 5b show a construction which substantially corresponds to that shown in FIGS. 4a and 4b, described above, but in which the force accumulators 23 and holders 56 are received in a recess of the segment gearwheel 10. On the other hand, the running groove 54, which is required for receiving the force accumulator 23, is arranged in, and the control elements are fitted at the housing 1 so as to be stationary.

The clutch actuator according to FIGS. 4a and 4b operates so that the running groove 54 corresponds in the circumferential direction to the adjusting path of the segment gearwheel 10 between its two exactly defined reference positions. Accordingly, provided there is no operating disturbance, the segment gearwheel 10 is rotated until the control element 32 which is associated with the respective movement direction and is arranged at the end of the running groove 54 as viewed in the circumferential direction has come into contact with the corresponding end of the force accumulator 23 without deforming the latter. Each of the control elements 32 is arranged radially between the two holders 52 so that it can move in between them and come into contact with the end of the force accumulator 23. If the segment gearwheel 10 approaches the associated stop 44 or 46 at excessive velocity due to a disturbance, a deformation of the force accumulator 23 is initiated via the respective effective control element 32, the force accumulator 23 being supported by its opposite end at the holders 52 of the housing 1 in this construction.

In the construction according to FIGS. 5a and 5b, the running groove 54 is also adapted to the "permissible" movement range of the segment gearwheel 10 as viewed in the circumferential direction. During regular operation of the clutch actuator, the force accumulator 23 which is received in the segment gearwheel 10 comes into contact with the associated control element 32, which is stationary in this construction, without being deformed. The two holders 56 at the segment gearwheel 10 move radially inside and radially outside the control element 32. When the segment gearwheel 10 approaches the associated stop 44, 46 at excessive speed, there is a deformation of the force accumulator 23 which is loaded at one end by the holders 56 in the direction of the stop and is supported at the other end at the control element 32.

Figure 6:
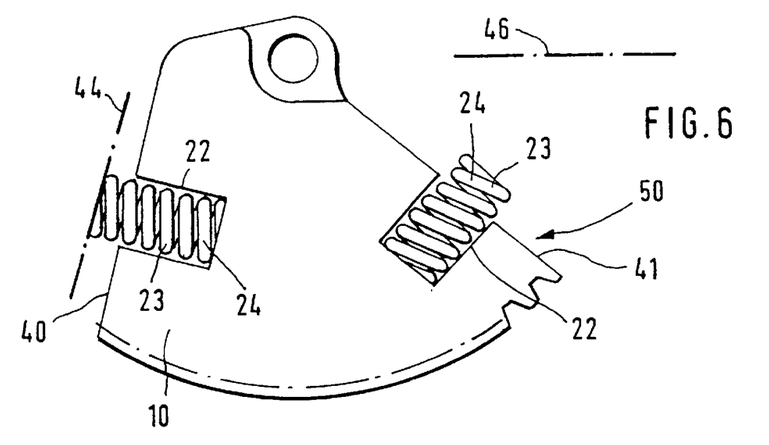
FIG. 6 is a segment gearwheel with force accumulators projecting out in the circumferential direction.
Figure 7:
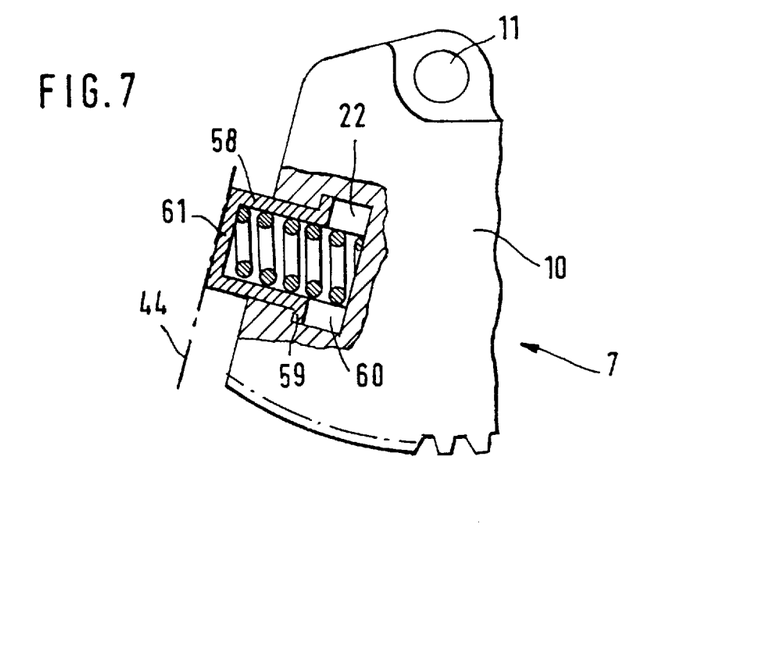
FIG. 7 is a view according to FIG. 6, but with a protective cover surrounding the force accumulator.

FIG. 6 shows a very simple construction of the damping device 50 in which the segment gearwheel 10 has force accumulators 23 in the form of coil springs 24 which are arranged in each instance in recesses 22 which extend substantially vertically to the associated circumferential boundary 40, 41 of the segment gearwheel 10. The coil springs 24 project out over the respective circumferential boundary 40, 41 by a distance which can be predetermined. During regular operation of the clutch actuator, these projecting ends of the coil springs 24 come into contact with the associated stop 44, 46 without the respective coil spring 24 being deformed. The segment gearwheel 10 then occupies its defined reference position relative to the associated stop 44, 46. On the other hand, in the event that the segment gearwheel 10 approaches the associated stop 44, 46 at excessive speed, the coil spring 24 coming into contact with the stop is deformed, its maximum deformation path being dimensioned such that the coil spring 24 lies with its free end flush with the circumferential boundary 40, 41 of the segment gearwheel 10. In an advantageous embodiment according to FIG. 7, the free end of the coil spring 24 is enclosed by a protective cover 58 formed of a cylindrical cap 61, for instance, and has a radial widened portion 59 at its end facing the recess 22, this widened portion 59 engaging behind a cross-sectional widening 60 of the recess 22. When the support cap 61 associated with the free end of the coil spring 24 is arranged at a smaller distance from the circumferential boundary 40, 41 of the segment gearwheel 10 facing the support cap 61 than it would be in the absence of the protective cover 58, the coil spring 24 is held with pretensioning by the protective cover 58.

Figure 8:
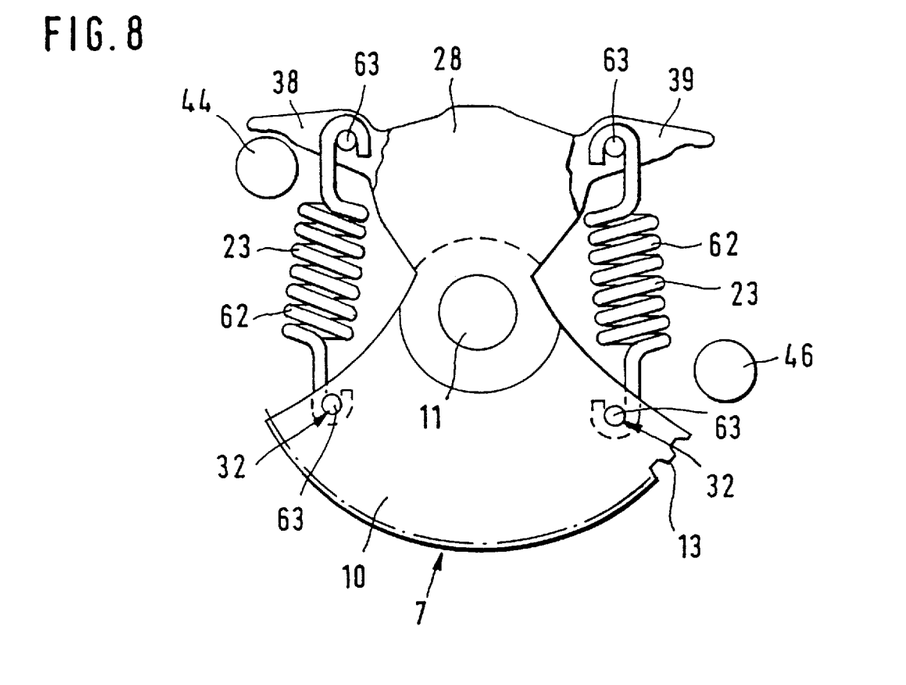
FIG. 8 is another embodiment of the clutch actuator with tension springs acting between a segment gearwheel and a stop element.

FIG. 8 shows a construction in which the force accumulators 23 are constructed as tension springs 62. The stop element 28 is offset by substantially 180° relative to the segment gearwheel 10 by the neck 11 and, like the segment gearwheel 10, has holders 63 for the respective tension springs 62. The stop element 28 is further provided with projections 38, 39 which can be brought into contact with the corresponding stops 44, 46. During regular operation of the adjusting device, the projection 38, 39 associated with a determined movement direction of the segment gearwheel 10 is moved toward the associated stop 44, 46 without resulting in a deformation of the tension springs 62 owing to the pretensioning of the latter. At excessive velocity of the segment gearwheel 10 and accordingly at an excessive approach speed of the projections 38, 39 toward the respective stop 44, 46, the moment acting at the segment gearwheel 10 exceeds the pretensioning of the corresponding tension spring 62 so that the latter is deflected in such a way that the segment gearwheel 10 is retarded.

Of course, a whole gearwheel can also be used instead of a segment gearwheel. Instead of the circumferential boundaries 40, 41 in the segment-type gearwheel which can be used as reference positions for determining the absolute position of the gearwheel in an optional rotational position of the gearwheel, it is possible when using a whole gearwheel to provide axial projections at the latter. These axial projections extend within the range of extension of stops and can come into contact with the latter after the deformation of the force accumulator of the associated damping device.

The invention is not limited by the embodiments described above which are presented as examples only but can be modified in various ways within the scope of protection defined by the appended patent claims.

We claim:

1. A clutch actuator for a motor vehicle friction clutch, comprising: a drive; a movable gear unit having an output member and being operatively connected to the drive to convert movement of the drive into a substantially translatory movement of the output member; a plurality of stops arranged to define an excursion of the gear unit in each working direction; clutch position detecting means for detecting clutch position; damping means associated with each stop; and control elements arranged to follow the movement of the gear unit and configured to be engagable with the damping means, the damping means being operable, when the gear unit reaches a position in which the gear unit has reached an exactly defined reference position relative and prior to one of the stops, in a movement directed toward the one stop, to retard the gear unit via the control elements until the gear unit comes into contact with the one stop, the damping means including at least one receptacle and at least one force accumulator arranged in a corresponding receptacle so as to be pretensioned to a predetermined degree so that the force accumulator can be acted upon by the control elements in the direction of a respective stop.

2. A clutch actuator according to claim 1, and further comprising: a housing, the gear unit including a segment gearwheel having a bearing neck mounted in the housing so that the segment gearwheel is rotatable; a stop element, in addition to the stops, associated with the segment gearwheel so as to be movable relative thereto, the stop element and the segment gearwheel having at least one recess for the force accumulator, the recess extending in a circumferential direction with reference to the bearing neck of the segment gearwheel, the stop element being arranged to project by a distance in the circumferential direction beyond a respective circumferential boundary of the segment gearwheel, which distance corresponds to a distance of the respective stop from the reference position associated therewith, the control element being provided at one of the segment gearwheel and the stop element so that, after the reference position, the control element, acting in the respective acting direction, is brought into a working connection with the force accumulator.

3. A clutch actuator according to claim 2, wherein the recess in the stop element and the segment gearwheel is provided with a widening at a side remote of the associated stop, the widening being configured to extend in the circumferential direction with reference to the bearing neck of the segment gearwheel, the control element engaging in the widening.

4. A clutch actuator according to claim 3, wherein the control elements are provided on the segment gearwheel and the stop element, the control elements of one of the segment gearwheel and the stop element being arranged to penetrate the widened portions of the recess of the other of the segment gearwheel and the stop element; and further comprising retaining means provided at free ends of the control elements for holding the control elements in the recesses.

5. A clutch actuator according to claim 2, wherein the force accumulator is a coil spring, a side of each control element facing a coil spring being aligned at an angle relative to the bearing neck of the segment gearwheel so that the coil spring, when acted upon by the control element, can be acted upon by a force which is directed substantially in an axial direction of the force accumulator.

6. A clutch actuator according to claim 1, and further comprising a housing, the gear unit including a toothed wheel supported in the housing so as to be rotatable, the control elements being mounted to the toothed wheel, the toothed wheel having a running groove for the force accumulator which extends in a circumferential direction, the housing having a holder arranged to hold the force accumulator so as to be stationary and actable upon by the control elements provided at the toothed wheel, the control elements being provided at the circumferential ends of the running groove which is dimensioned so that one of the control elements comes into contact with the force accumulator when the reference position associated with the corresponding stop is reached, the toothed wheel being retarded by the force accumulator after this reference position.

7. A clutch actuator according to claim 1, and further comprising a housing, the gear unit including a toothed wheel rotatably supported in the housing by a bearing neck, the tooth wheel having a holder configured to fix the force accumulator, the control elements being mounted to the housing the housing having a running groove in which the force accumulator is arranged so as to be actable upon by the control elements provided at the housing, the running groove being arranged to extend in the circumferential direction with reference to the bearing neck of the toothed wheel, the control elements being provided at the circumferential ends of the running groove, the running groove being dimensioned so that one of the control elements comes into contact with the force accumulator when the reference position associated with the corresponding stop is reached, the toothed wheel being retarded by the force accumulator after this reference position.

8. A clutch actuator according to claim 1, wherein the gear unit includes a toothed wheel and a stop element associated therewith, the damping means including a force accumulator configured as a tension spring, and further comprising holders mounted on the toothed wheel and the stop element for each end of the spring, the stops being arranged with respect to their positioning relative to a determined rotational position of the toothed wheel so that a projection of the stop element comes into contact with an associated one of the stops when the toothed wheel has reached its reference position, the tension spring being arranged and configured to retard the toothed wheel after this reference position in that the tension spring is deflected from its initial state.

9. A clutch actuator for a motor vehicle friction clutch comprising: a drive; a movable gear unit having an output member and being operatively connected to the drive to convert movement of the drive into a substantially translatory movement of the output member; a plurality of stops arranged to define an excursion of the gear unit in each working direction; clutch position detecting means for detecting clutch position; damping means associated with each stop; and control elements arranged to follow the movement of the gear unit and configured to be engagable with the damping means, the damping means being operable when the gear unit reaches a position in which the gear unit has reached an exactly defined reference position relative and prior to one of the stops, in a movement directed toward the one stop, to retard the gear unit via the control elements until the gear unit comes into contact with the one stop, the gear unit including a segment gearwheel having circumferential boundaries, and further comprising at least one force accumulator provided at each of the circumferential boundaries of the segment gearwheel so as to have a portion that projects beyond the circumferential boundaries in a direction of an associated one of the stops, a length of the projecting portion of the force accumulator relative to the circumferential boundary corresponds at least to a distance of the stop from the associated reference position, after which reference position a retardation of the segment gearwheel is effected.

10. A clutch actuator according to claim 9, wherein the segment gearwheel has recesses in which the force accumulators are arranged, the recesses being configured to extend away from the associated stop in a circumferential direction proceeding from the respective circumferential boundary, the force accumulators being configured as coil springs.

11. A clutch actuator according to claim 10, and further comprising, for each coil spring, a protective cover arranged to enclose an end of the coil spring facing the stop, the protective cover being supported in the recess so as to be displaceable, the cover having a radial widened portion that engages behind a corresponding cross-sectional widening in the recess so as to prevent disengagement.

12. A clutch actuator according to claim 11, wherein the protective cover has a support cap for the free end of the coil spring, provided so that a distance is present between the support cap of the protective cover and the circumferential boundary of the segment gearwheel, which distance is smaller than a distance by which the free end of the coil spring projects beyond the associated circumferential boundary without a protective cover, so as to pretension the coil spring.

* * * * *